United States Patent [19]

Furukawa et al.

[11] Patent Number: 5,290,509
[45] Date of Patent: Mar. 1, 1994

[54] MULTIPHASE HYDROGEN-ABSORBING ALLOY ELECTRODE FOR AN ALKALINE STORAGE CELL

[75] Inventors: Nobuhiro Furukawa, Osaka; Kazuro Moriwaki, Kyoto; Mitsuzo Nogami; Seiji Kameoka, both of Osaka; Motoo Tadokoro, Ashiya, all of Japan

[73] Assignee: Sanyo Electric Co., Ltd., Osaka, Japan

[21] Appl. No.: 19,340

[22] Filed: Feb. 18, 1993

Related U.S. Application Data

[63] Continuation of Ser. No. 644,154, Jan. 22, 1991, abandoned.

[30] Foreign Application Priority Data

Jan. 22, 1990 [JP] Japan ................................. 2-12932
Mar. 28, 1990 [JP] Japan ................................. 2-80116

[51] Int. Cl.$^5$ ............................................. H01M 4/38
[52] U.S. Cl. .................................... 420/435; 420/455; 420/580; 420/900; 429/218; 429/223; 429/224; 148/425; 148/426
[58] Field of Search ................. 148/425, 426, 302; 420/435, 455, 900, 580; 423/644; 429/218, 223, 224

[56] References Cited

U.S. PATENT DOCUMENTS

| | | | |
|---|---|---|---|
| 4,004,943 | 1/1977 | Boter . | |
| 4,222,770 | 9/1980 | Osumi et al. | 423/644 |
| 4,495,258 | 1/1985 | Le Méhauté et al. | 429/218 |
| 4,609,599 | 9/1986 | Percheron nee Guegan et al. | 429/218 |
| 5,008,164 | 4/1991 | Furukawa et al. | 420/900 |
| 5,049,208 | 9/1991 | Yajima et al. | 148/302 |
| 5,071,493 | 12/1991 | Mizoguchi et al. | 148/302 |

FOREIGN PATENT DOCUMENTS 59-49671 12/1984 Japan .
62-20245 1/1987 Japan .

*Primary Examiner*—R. Dean
*Assistant Examiner*—Margery S. Phipps
*Attorney, Agent, or Firm*—Armstrong, Westerman, Hattori, McLeland & Naughton

[57] ABSTRACT

A hydrogen-absorbing alloy electrode for an alkaline storage cell, the electrode including a hydrogen-absorbing alloy expressed by a composition formula $ReB_xM_y$, wherein Re is at least one element selected from a group consisting of rare earth elements and alkali earth elements, B is boron, and M is at least one element selected from a group consisting of Ni, Co, Mn, Al, Cr, Fe, Cu, Sn, Sb, Mo, V, Nb, Ta, Zn, Zr and Ti. The alloy consists essentially of an $RM_y$ main metal phase, and a subordinate boron-containing phase, such as a compound phase of boron and a IV-a, V-a, or VI-a group metal.

7 Claims, 11 Drawing Sheets

MULTIPHASE HYDROGEN-ABSORBING ALLOY ELECTRODE FOR AN ALKALINE STORAGE CELL

This application is a continuation of application Ser. No. 07/644,154 filed Jan. 22, 1991, now abandoned.

BACKGROUND OF THE INVENTION (1) Field of the Invention

This invention relates to a hydrogen-absorbing alloy electrode used as a negative electrode of an alkaline storage cell.

(2) Description of the Prior Art

Conventional storage cells include nickel-cadmium or other alkaline cells and lead cells. Drawing current attention is a metal oxide-hydrogen alkaline storage cell comprising a hydrogen-absorbing alloy electrode, which can realize lightness, large capacity and high energy density. Used for such an electrode is a hydrogen-absorbing alloy such as $LaNi_5$ (disclosed in U.S. Pat. No. 4,004,943), $LaNi_4Co$, or $LaNi_{4.8}Fe_{0.2}$. $LaNi_4Co$ and $LaNi_{4.8}Fe_{0.2}$ have both been developed from $LaNi_5$. Also having been developed for use in the above electrode are hydrogen-absorbing alloys including Misch metal (Mm), which is a mixture of rare earth elements such as La, Ce, Pr, Nd and Sm (Japanese Patent Publication Kokai No. 62-20245).

A negative electrode using a hydrogen-absorbing alloy reacts on a surface of the hydrogen-absorbing alloy and absorbs hydrogen generated while the cell is charged into the alloy. If the hydrogen-absorbing alloy used for the negative electrode absorbs an especially large amount of hydrogen and so is excellent in functioning as a catalyst, the negative electrode obtains a high energy density. Moreover, a cell having such an electrode is completely compatible with a nickel-cadmium cell having a cadmium negative electrode since both of the cells have the similar charge/discharge potential.

The cell employing the hydrogen-absorbing alloy as the negative electrode has an energy density which is approx. 1.5 times as high as that of a nickel-cadmium cell.

The hydrogen-absorbing alloys which have been developed so far have an ability of absorbing and desorbing a large amount of hydrogen, namely, has a high energy density, in the room temperature, where a cell is usually used. However, these alloys result in low initial charge/discharge efficiency and thus in insufficient electrochemical capacity on the initial stage of charge/discharge cycles. More specifically, an electrode using such a hydrogen-absorbing alloy is easy to charge from the initial stage, but the process of diffusing hydrogen from the inside to the outside of the alloy is a rate-determining step and so the polarity is changed with hydrogen remaining in the alloy. This phenomenon deteriorates the discharge efficiency.

SUMMARY OF THE INVENTION

Accordingly, the present invention has an object to offer a hydrogen-absorbing alloy electrode which improves the initial charge/discharge efficiency of an alkaline storage cell. Another object of the present invention is to offer a hydrogen-absorbing alloy electrode which improves the cycle characteristic of an alkaline storage cell.

The above objects are fulfilled by a hydrogen-absorbing alloy electrode for an alkaline storage cell, the electrode comprising a hydrogen-absorbing alloy expressed by a composition formula $RB_xM_y$, wherein R is at least one element selected from a group consisting of rare earth elements and alkali earth elements, B is boron,, and M is at least one element selected from a group consisting of Ni, Co, Mn, Al, Cr, Fe, Cu, Sn, Sb, Mo, V, Nb, Ta, Zn, Zr and Ti. The rare earth elements include Sc, Y, La, Ce, Pr, Nd and Sm. The alkali earth elements include Be, Mg, Ca and Sr.

The amount of x may be $0.005 \leq x \leq 0.1$ and the amount of y may be $3.5 < y < 6.0$.

More preferably, the amount of x may be $0.015 \leq x \leq 0.1$.

The alloy may include a hydride which has an equilibrium pressure (absorption pressure) of 0.05 to 5 air pressure in a temperature of 40° C.

M may include Co and Al.

M may include Co and Mn.

M may include Co, an element selected from a group consisting of Mn and Al, and an element selected from a group consisting of Mo, Zr and Cr.

The above objects are also fulfilled by a hydrogen-absorbing alloy electrode for an alkaline storage cell, the electrode comprising a hydrogen-absorbing alloy comprising a plurality of metal compounds, wherein a main metal phase of the alloy is indicated by a composition formula R-M and a subordinate metal phase of the alloy includes at least boron, R being at least one element selected from a group consisting of rare earth elements and alkali earth elements, and M being at least one element selected from a group consisting of Ni, Co, Mn, Al, Cr, Fe, Cu, Sn, Sb, Mo, V, Nb, Ta, Zn, Zr and Ti.

The subordinate metal phase may include at least a metal phase selected from a group of a compound phase of boron and a IVa-group metal, a compound phase of boron and a Va-group metal, and a compound phase of boron and a VIa-group metal. The IVa-group metals include Ti, Zr and Hf; the Va-group metals include V, Nb and Ta; and the VIa-group metals include Cr, Mo and W.

The above objects are fulfilled by the above constructions for the following reasons.

It has been proved through experiments that the alloy expressed with $RB_xM_y$ promotes formation of cracks on the initial stage of charge/discharge cycles. The formation of the cracks increases the reacting area from the 1st cycle. Since the cracks are formed on the surface rich with boron, surfaces newly formed by the cracks are also rich with boron. Hydrogen atoms are assumed to be diffused faster on the surfaces rich with boron than on the surfaces without boron. Therefore, the reacting speed is higher on the newly formed surfaces, which enhances the initial charge/discharge efficiency.

When boron is added in approx. 0.015 mol/1 mol of the alloy to form two metal phases: a main phase for absorbing and desorbing hydrogen and a subordinate phase including boron, still more cracks are formed. This fact still enhances the initial charge/discharge efficiency.

The alloy expressed with $RB_xM_y$ is easy to crack but is too hard to become fine powders easily, which increases the charge/discharge cycle characteristic of the cell.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

Embodiment 1

Figure 1:
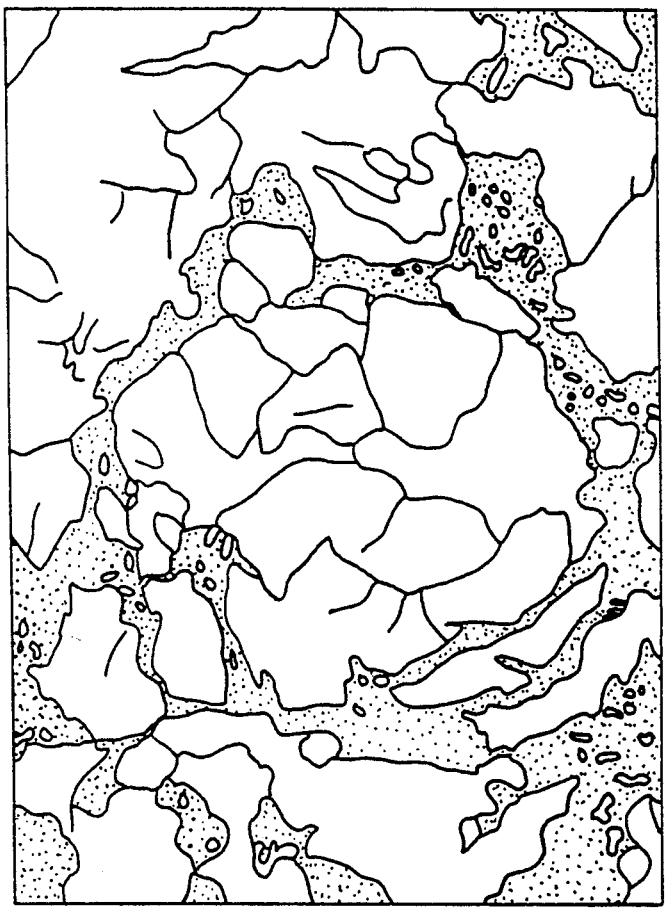
FIG. 1 is a view showing a surface of the hydrogen-absorbing alloy of Electrode $A_8$ according to the present invention.

Example 1 According to the Present Invention

An ingot of a hydrogen-absorbing alloy expressed by $LaB_{0.05}Ni_{4.95}$ was produced in a high-frequency induction furnace using materials available in the market. The obtained ingot was mechanically pulverized into hydrogen-absorbing alloy powders each having a grain size of 50 μm or less.

Polytetrafluoroethylene powders were mixed as a binder in 10% with the hydrogen-absorbing alloy powders into a paste. The paste was wrapped with a nickel mesh and pressurized by a force of 1 ton/cm², whereby obtaining a hydrogen-absorbing alloy electrode. The obtained alloy electrode is referred to as Electrode $A_1$.

In the above and all the following examples, an element having a high melting point (for example, B, namely, boron) was solid-solubilized with Ni into an alloy before being put in the furnace.

Examples 2 and 3 according to the present invention

Electrodes $A_2$ and $A_3$ were produced in the same manner as in Example 1 but with different Ni/B element ratios as shown in Table 1 below.

COMPARATIVE EXAMPLE 1

Electrode $X_1$ was produced in the same manner as in Example 1 but using a hydrogen-absorbing alloy with no B added.

Experiment 1

Electrodes $A_1$ through $A_3$ and $X_1$ were each subjected to a charge/discharge cycle test to check the charge/discharge efficiency (the ratio of the electrochemical capacity after the 1st cycle against the electrochemical capacity after the 10th cycle). The results are in Table 1. The charge/discharge cycle test was conducted in a container pressurized by an atmospheric pressure of 5, using a 30 wt. % solution of KOH as an electrolyte. The electrodes were each charged by a current of 50 mA/g for 8 hours and then discharged by a current of 100 mA/g until the electrode potential reached −0.7 V vs Hg/HgO.

TABLE 1

| Electrode | Composition | Electrochemical capacity after 1st cycle (mAh/g) | Electrochemical capacity after 10th cycle (mAh/g) | Ratio of 1st/10th cycle (%) |
| --- | --- | --- | --- | --- |
| $A_1$ | $LaB_{0.05}Ni_{4.95}$ | 270 | 285 | 94.7 |
| $A_2$ | $LaB_{0.5}Ni_{4.75}$ | 261 | 270 | 96.7 |
| $A_3$ | $LaBNi_{4.3}$ | 243 | 255 | 95.3 |
| $X_1$ | $LaNi_5$ | 260 | 285 | 91.2 |

As shown in Table 1, Electrodes $X_1$ using $LaNi_5$, which is a representative hydrogen-absorbing alloy, obtained the efficiency of 91.2%. Electrode $A_1$ including 0.05 mol of B obtained 94.7%, Electrode $A_2$ including 0.5 mol of B obtained 96.7%, and Electrode $A_3$ including 1 mol of B obtained 95.3%. Electrodes $A_1$ through $A_3$ are all superior to Electrode $X_1$ in the charge/discharge efficincy.

Example 4 According to the Present Invention

La is often substituted by Mm (La:25, Ce:50, Nd:20, Pr:5) since rare earth - Ni alloys are inexpensive and highly anti-corrosion. Electrode $A_4$ was produced in the same manner as in Example 1 except that La was substituted by Mm.

Comparative Example 2

Electrode $X_2$ was produced in the same manner as in Comparative example 1 except that La was substituted by Mm.

Experiment 2

Concerning Electrodes $A_4$ and $x_2$, the charge/discharge efficiency was examined. The experiment conditions were the same as in Experiment 1.

TABLE 2

| Electrode | Composition | Electrochemical capacity after 1st cycle (mAh/g) | Electrochemical capacity after 10th cycle (mAh/g) | Ratio of 1st/10th cycle (%) |
| --- | --- | --- | --- | --- |
| $A_4$ | $MmB_{0.05}Ni_5$ | 139 | 145 | 95.8 |
| $X_2$ | $MmNi_5$ | 90 | 150 | 60.0 |

In the ratio of electrochemical capacity after the 1st cycle against that after the 10th cycle, Electrode $A_4$ including B is much higher than Electrode $X_2$ including no B. This means Electrode $A_4$ is superior to Electrode $X_2$ in the charge/discharge efficiency.

Example 5 According to the Present Invention

Although Electrode $A_4$ is superior to Electrode $X_2$ in the charge/discharge efficiency, Electrode $A_4$ is inferior to Electrodes $A_1$ through $A_3$ in the electrochemical capacity. This fact is attributed to that the Mm - Ni alloy has a higher hydrogen-absorbing equilibrium pressure than $LaNi_5$, or more specifically, that the hydrogen-absorbing equilibrium pressure (hydrogen absorption pressure) of the Mn - Ni alloy is 5 air pressure or more in a temperature of 40° C. Then, Electrode $A_5$ was produced using the Mm - Ni alloy where Ni is partially substituted by Co. The substitution was conducted in order to adjust the hydrogen pressure should be adjusted to an air pressure 0.05 and 5. The production method was the same as in Example 4 except the substitution. It should be noted that Co is important for improving resistance against corrosion.

Examples 6 Through 9 According to the Present Invention

Electrodes $A_6$ through $A_9$ were produced in the same manner as in Example 5 with different ratios of B or with Ni of the Mm-Ni alloy being partially substituted by Al, Mn or both Al and Mn in addition to Co.

Comparative Examples 3 Through 5

Electrodes $X_3$ through $X_5$ were produced with the compositions shown in Table 3 with no B added.

Experiment 3

The charge/discharge efficiency was examined concerning Electrodes $A_5$ through $A_9$ and $X_3$ through $X_5$ in the same conditions as in Experiment 1.

TABLE 3

| Electrode | Composition | Electrochemical capacity after 1st cycle (mAh/g) | Electrochemical capacity after 10th cycle (mAh/g) | Ratio of 1st/ 10th cycle (%) |
|---|---|---|---|---|
| $A_5$ | $MmB_{0.005}Ni_2Co_3$ | 187 | 198 | 94.4 |
| $A_6$ | $MmB_{0.5}Ni_2Co_3$ | 188 | 197 | 95.4 |
| $A_7$ | $MmB_{0.05}Ni_{3.5}Co_{1.2}Al_{0.8}$ | 239 | 249 | 96.0 |
| $A_8$ | $MmB_{0.05}Ni_{3.5}Co_{0.07}Mn_{0.8}$ | 279 | 295 | 94.6 |
| $A_9$ | $MmB_{0.05}Ni_{3.3}CoAl_{0.3}Mn_{0.4}$ | 268 | 290 | 92.4 |
| $X_3$ | $MmNi_2Co_3$ | 153 | 200 | 76.5 |
| $X_4$ | $MmNi_{3.5}Co_{0.7}Al_{0.8}$ | 195 | 251 | 77.7 |
| $X_5$ | $MmNi_{3.5}Co_{0.07}Mn_{0.8}$ | 196 | 295 | 66.4 |

As apparent from Table 3, Electrodes $A_5$ through $A_9$ including B are superior to Electrodes $X_3$ through $X_5$ including no B in the charge/discharge efficiency.

Al and Mn are effective in reducing the hydrogen absorption pressure and thus increasing electrochemical capacity, but have a problem of reducing the initial charge/discharge efficiency. This is considered to occur because 1) the volume of the alloy lattice is increased by Al and Mn, whereby the alloy is hard to crack after hydrogen is absorbed or desorbed; and 2 an oxidized layer formed on the alloy including Al and Mn tends to obstruct hydrogen diffusion. However, Experiment 3 has proved the above problem is solved by adding B to the alloy including Al and Mn. This is apparent from comparing, for example, Electrodes $A_8$ and $X_5$.

Examples 10 Through 21 According to the Present Invention

Electrodes $A_{10}$ through $A_{21}$ were produced in the same manner as in Example 9 except that Co is partially substituted by Cr, Fe, Cu, Sn, Sb, Mo, V, Nb, Ta, Zn, Zr and Ti, respectively.

Experiment 4

Concerning Electrodes $A_{10}$ through $A_{21}$, the charge/discharge efficiency was examined in the same conditions as in Experiment 1. The results are in Table 4.

TABLE 4

| Electrode | Composition | 1st[1] | 10th[2] | Ratio[3] |
|---|---|---|---|---|
| $A_{10}$ | $MmB_{0.05}Ni_{3.3}Co_{0.8}Al_{0.3}Mn_{0.4}Cr_{0.2}$ | 290 | 291 | 99.6 |
| $A_{11}$ | $MmB_{0.05}Ni_{3.3}Co_{0.8}Al_{0.3}Mn_{0.4}Fe_{0.2}$ | 272 | 293 | 92.8 |
| $A_{12}$ | $MmB_{0.05}Ni_{3.3}Co_{0.8}Al_{0.3}Mn_{0.4}Cu_{0.2}$ | 285 | 293 | 97.3 |
| $A_{13}$ | $MmB_{0.05}Ni_{3.3}Co_{0.8}Al_{0.3}Mn_{0.4}Sn_{0.2}$ | 277 | 290 | 95.5 |
| $A_{14}$ | $MmB_{0.05}Ni_{3.3}Co_{0.8}Al_{0.3}Mn_{0.4}Sb_{0.2}$ | 273 | 291 | 93.8 |
| $A_{15}$ | $MmB_{0.05}Ni_{3.3}Co_{0.8}Al_{0.3}Mn_{0.4}Mo_{0.2}$ | 289 | 291 | 99.3 |
| $A_{16}$ | $MmB_{0.05}Ni_{3.3}Co_{0.8}Al_{0.3}Mn_{0.4}V_{0.2}$ | 275 | 297 | 92.5 |
| $A_{17}$ | $MmB_{0.05}Ni_{3.3}Co_{0.8}Al_{0.3}Mn_{0.4}Nb_{0.2}$ | 263 | 290 | 90.7 |
| $A_{18}$ | $MmB_{0.05}Ni_{3.3}Co_{0.8}Al_{0.3}Mn_{0.4}Ta_{0.2}$ | 263 | 282 | 93.3 |
| $A_{19}$ | $MmB_{0.05}Ni_{3.3}Co_{0.8}Al_{0.3}Mn_{0.4}Zn_{0.2}$ | 265 | 293 | 90.4 |
| $A_{20}$ | $MmB_{0.05}Ni_{3.3}Co_{0.8}Al_{0.3}Mn_{0.4}Zr_{0.2}$ | 291 | 297 | 98.0 |
| $A_{21}$ | $MmB_{0.05}Ni_{3.3}Co_{0.8}Al_{0.3}Mn_{0.4}Ti_{0.2}$ | 260 | 265 | 98.1 |

[1] Electrochemical capacity after the 1st cycle (mAh/g)
[2] Electrochemical capacity after the 10th cycle (mAh/g)
[3] Ratio of 1st/10th cycle Some of Electrodes $A_{10}$ through $A_{21}$ are still superior to Electrode $A_9$ in the charge/discharge efficiency.

Examples 22 Through 26 According to the Present Invention

Electrodes $A_{22}$ through $A_{26}$ were produced in the same manner as in Example 9 except that B, Ni. Co, Al and Mn were changed in amount.

Experiment 5

Concerning Electrodes $A_{22}$ through $A_{26}$, the charge/discharge efficiency was examined in the same conditions as in Experiment 1. The results are in Table 5.

TABLE 5

| Electrode | Composition | 1st[1] | 10th[2] | Ratio[3] |
|---|---|---|---|---|
| $A_{22}$ | $MmB_{0.05}Ni_{2.5}Co_{0.5}Al_{0.2}Mn_{0.3}$ | 239 | 242 | 98.7 |
| $A_{23}$ | $MmB_{0.05}Ni_{2.8}Co_{0.7}Al_{0.3}Mn_{0.3}$ | 252 | 263 | 95.8 |
| $A_{24}$ | $MmB_{0.05}Ni_{3.2}Co_{0.8}Al_{0.4}Mn_{0.4}$ | 288 | 295 | 97.6 |
| $A_{25}$ | $MmB_{0.5}Ni_{3.2}Co_{0.8}Al_{0.4}Mn_{0.4}$ | 279 | 293 | 95.2 |
| $A_{26}$ | $MmB_{0.5}Ni_{3.2}CoAl_{0.5}Mn_{0.6}$ | 269 | 275 | 97.8 |

[1] Electrochemical capacity after the 1st cycle (mAh/g)
[2] Electrochemical capacity after the 10th cycle (mAh/g)
[3] Ratio of 1st/10th cycle Electrodes $A_{22}$ through $A_{26}$ are generally excellent in the charge/discharge efficiency with only a little difference.

Examples 27 and 28 According to the Present Invention

Electrodes $A_{27}$ and $A_{28}$ were produced in the same manner as in Example 9 except that Mm and Co are partially substituted by Mg ($A_{27}$) and Ca ($A_{28}$).

Comparative Examples 6 and 7

Electrodes $X_6$ and $X_7$ were produced in the same manner as in Examples 27 and 28 but with no B added.

Experiment 6

Concerning Electrodes $A_{27}$, $A_{28}$, $X_6$ and $X_7$, the charge/discharge efficiency was examined in the same conditions as in Experiment 1. The results are in Table 6.

TABLE 6

| Electrode | Composition | 1st[1] | 10th[2] | Ratio[3] |
|---|---|---|---|---|
| $A_{27}$ | $Mm_{0.8}Mg_{0.2}B_{0.05}Ni_{3.3}Co_{0.8}Al_{0.3}Mn_{0.4}$ | 289 | 294 | 98.3 |
| $A_{28}$ | $Mm_{0.8}Ca_{0.2}B_{0.05}Ni_{3.3}Co_{0.8}Al_{0.3}Mn_{0.4}$ | 273 | 292 | 93.5 |
| $X_6$ | $Mm_{0.8}Mg_{0.2}Ni_{3.3}Co_{0.8}Al_{0.3}Mn_{0.4}$ | 253 | 296 | 85.4 |
| $X_7$ | $Mm_{0.8}Ca_{0.2}Ni_{3.3}Co_{0.8}Al_{0.3}Mn_{0.04}$ | 247 | 298 | 82.8 |

[1] Electrochemical capacity after the 1st cycle (mAh/g)
[2] Electrochemical capacity after the 10th cycle (mAh/g)
[3] Ratio of 1st/10th cycle Electrodes $A_{27}$ and $A_{28}$ including B are superior to Electrodes $X_6$ and $X_7$ including no B in the charge/discharge efficiency.

Experiment 7

Electrodes $A_8$ and $X_5$ were charged and discharged for one cycle and the grain construction of the electrodes were examined with a scanning electronic microscope (magnification: 1,000). The results are in FIGS. 1 through 4.

The hydrogen-absorbing alloy of Electrode $A_8$ was manufactured by dissolving Mm, Ni, Co, Mn and $Ni_4B_3$ in a high-frequency induction furnace in a weight ratio of 1:3.433:0.7:0.8:0.017. $Ni_4B_3$ is a mother alloy including B in approx. 10 wt. %. The reason for using B in the form of an alloy is a single body of B has a melting point which is too high (2,180° C.) to dissolve in a regular high-frequency induction furnace. The melting point of $Ni_4B_3$ is 1,100° C.

Figure 2:
FIG. 2 is a view showing the surface of the alloy in FIG. 1 after abrasion.
Figure 3:
FIG. 3 is a view showing a surface of the hydrogen-absorbing alloy of Electrode $X_5$ as a comparative example.
Figure 4:
FIG. 4 is a view showing the surface of the alloy in FIG. 3 after abrasion.

FIG. 1 shows a surface of the hydrogen-absorbing alloy of Electrode $A_8$, FIG. 2 shows the surface thereof after abrasion, FIG. 3 shows a surface of the hydrogen-absorbing alloy of Electrode $X_5$ including no B, and FIG. 4 shows the surface thereof after abrasion.

As apparent from FIGS. 1 through 4, Electrode $A_8$ including B has a larger number of bigger cracks than Electrode $X_5$ including no B, which means Electrode $A_8$ reacted in a larger area than Electrode $X_5$ from the first cycle. Since the cracks are formed on a surface rich with B, surfaces newly formed by the cracks are also rich with B. Diffusion of hydrogen atoms is assumed to proceed faster on a surface rich with B than on a surface with no B. For these reasons, adding B to a rare earth-Ni alloy ($LaNi_5$ or the like) is effective in improving the charge/discharge efficiency of the electrode on the initial stage of charge/discharge cycles.

Experiment 8

The following Tests 1, 2 and 3 were carried out in order to obtain the optimum amount of B.

Test 1

Figure 5:
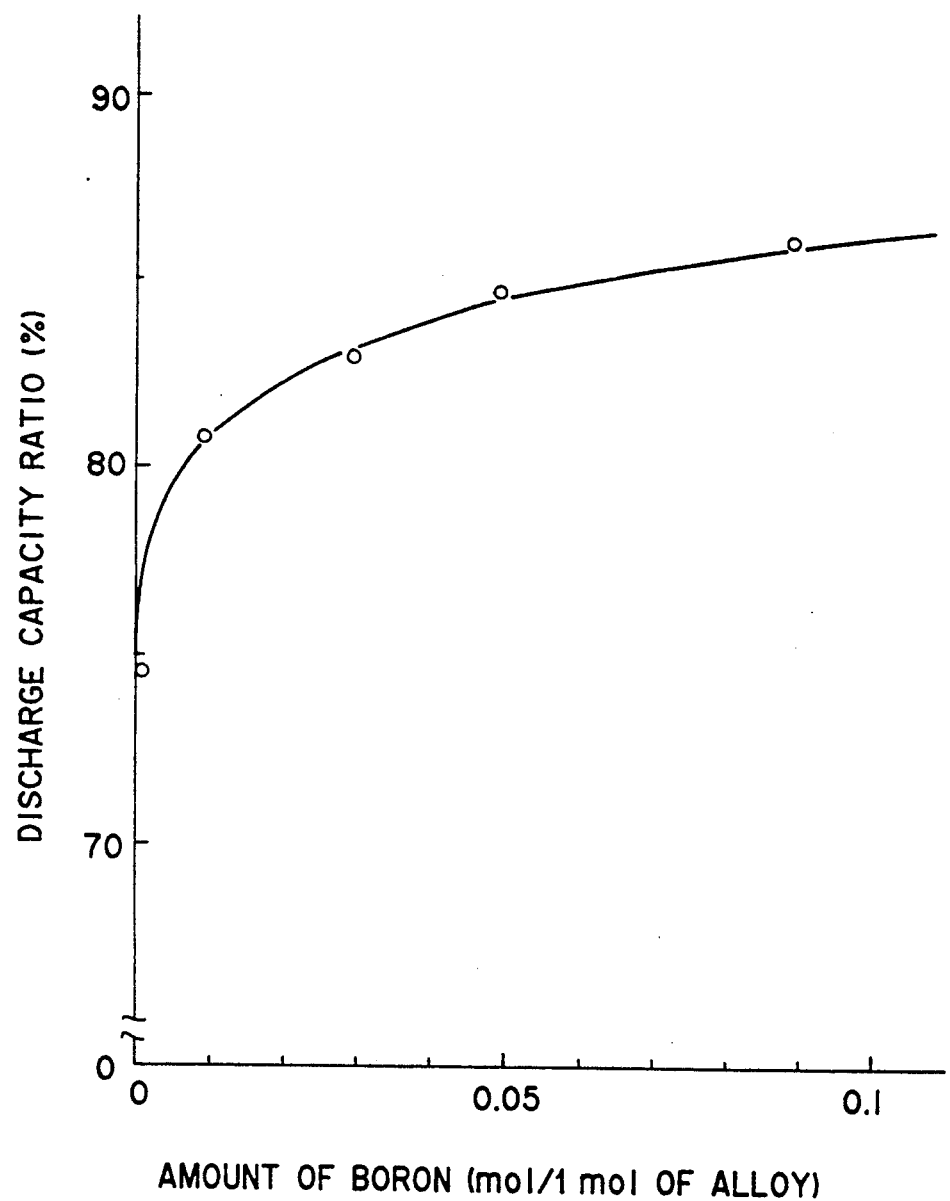
FIG. 5 is a graph showing the relationship between the amount of boron in an alloy and the ratio of the discharge capacity after the 1st cycle against the discharge capacity after the 10th cycle.

The relationship between the amount of B and the discharge capacity ratio (after the 1st cycle against after the 10th cycle) was obtained by discharging $MmNi_{3.2}CoMn_{0.6}Al_{0.2}Bx$ ($x \geq 0$) with a current of 2 C. The results shown in FIG. 5 indicate 0.005 mol of B per 1 mol of the alloy is enough to be effective.

Figure 6:
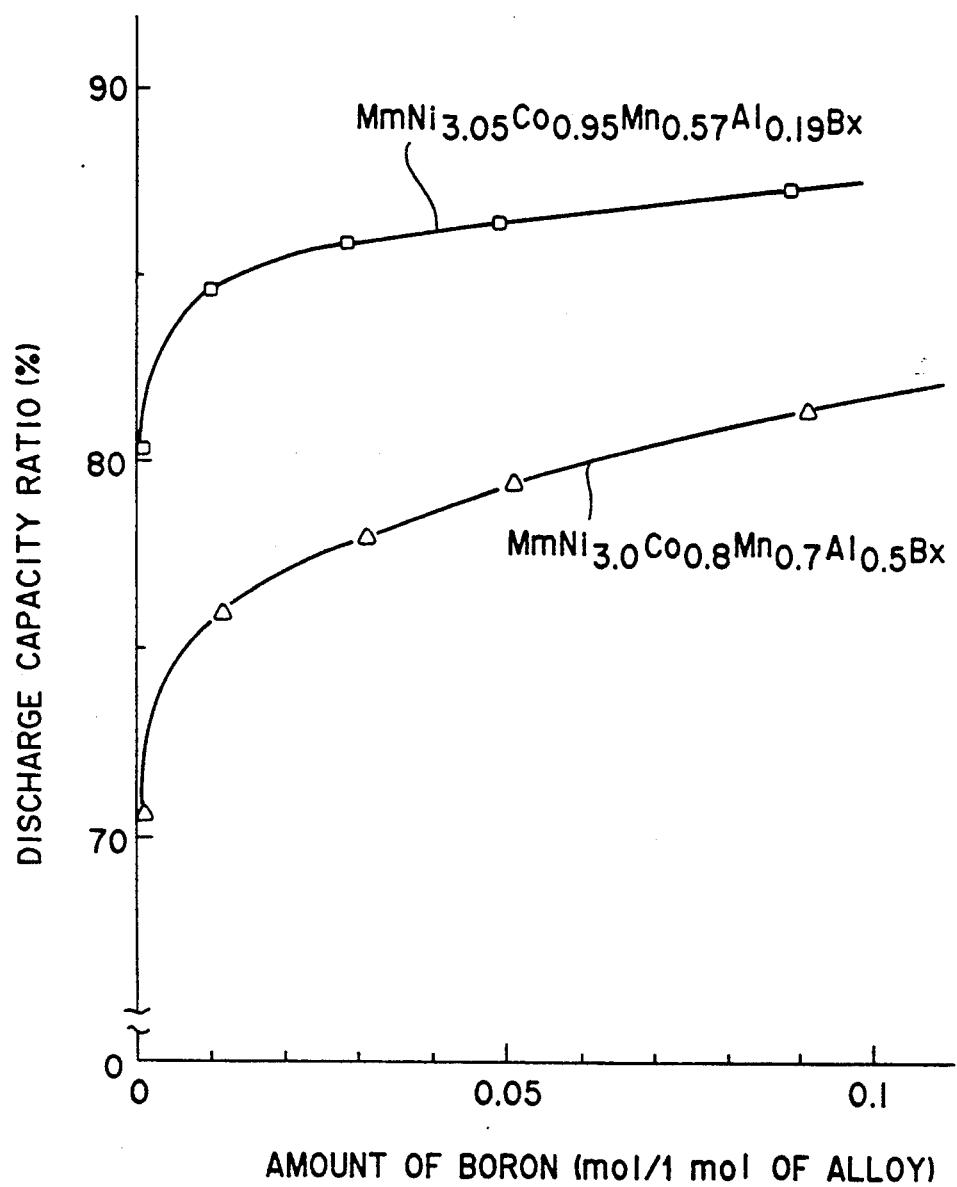
FIG. 6 is a graph showing the above relationship obtained with different alloys.

FIG. 6 shows the results of the same type of test conducted with $MmNi_{3.05}Co_{0.95}Mn_{0.57}Al_{0.19}Bx$ ($x \geq 0$) and $MmNi_{3.0}Co_{0.8}Mn_{0.7}Al_{0.5}Bx$ ($x \geq 0$) instead of using $MmNi_{3.2}CoMn_{0.6}Al_{0.2}Bx$ ($x \geq 0$). FIG. 6 indicates the same results as in FIG. 5.

It can be concluded that it is desirable that B is added at least in 0.005 mol per 1 mol of the alloy.

Test 2

Figure 7:
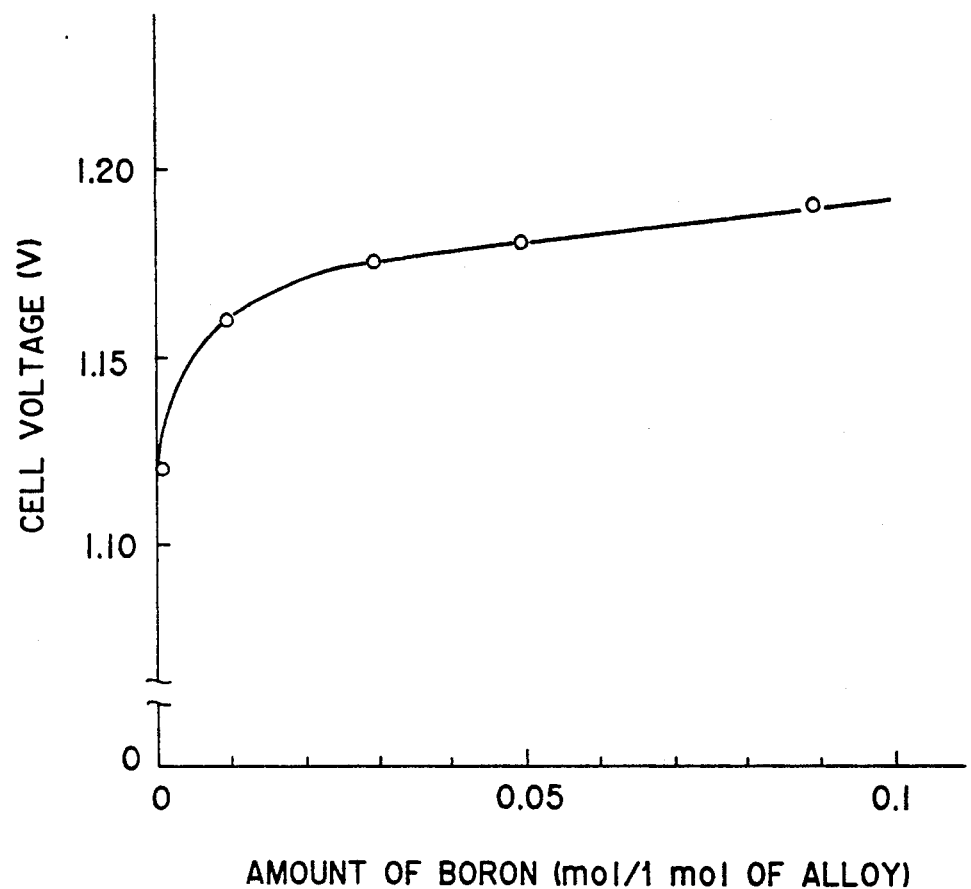
FIG. 7 is a graph showing the relationship between the amount of boron and the cell voltage.

The relationship between the amount of B and the cell voltage was obtained by discharging $MmNi_{3.2}CoMn_{0.6}Al_{0.2}Bx$ ($x \geq 0$) with a current of 2 C. The results shown in FIG. 7 indicate 0.005 mol of B per 1 mol of the alloy is enough to be effective.

Test 3

Figure 8:
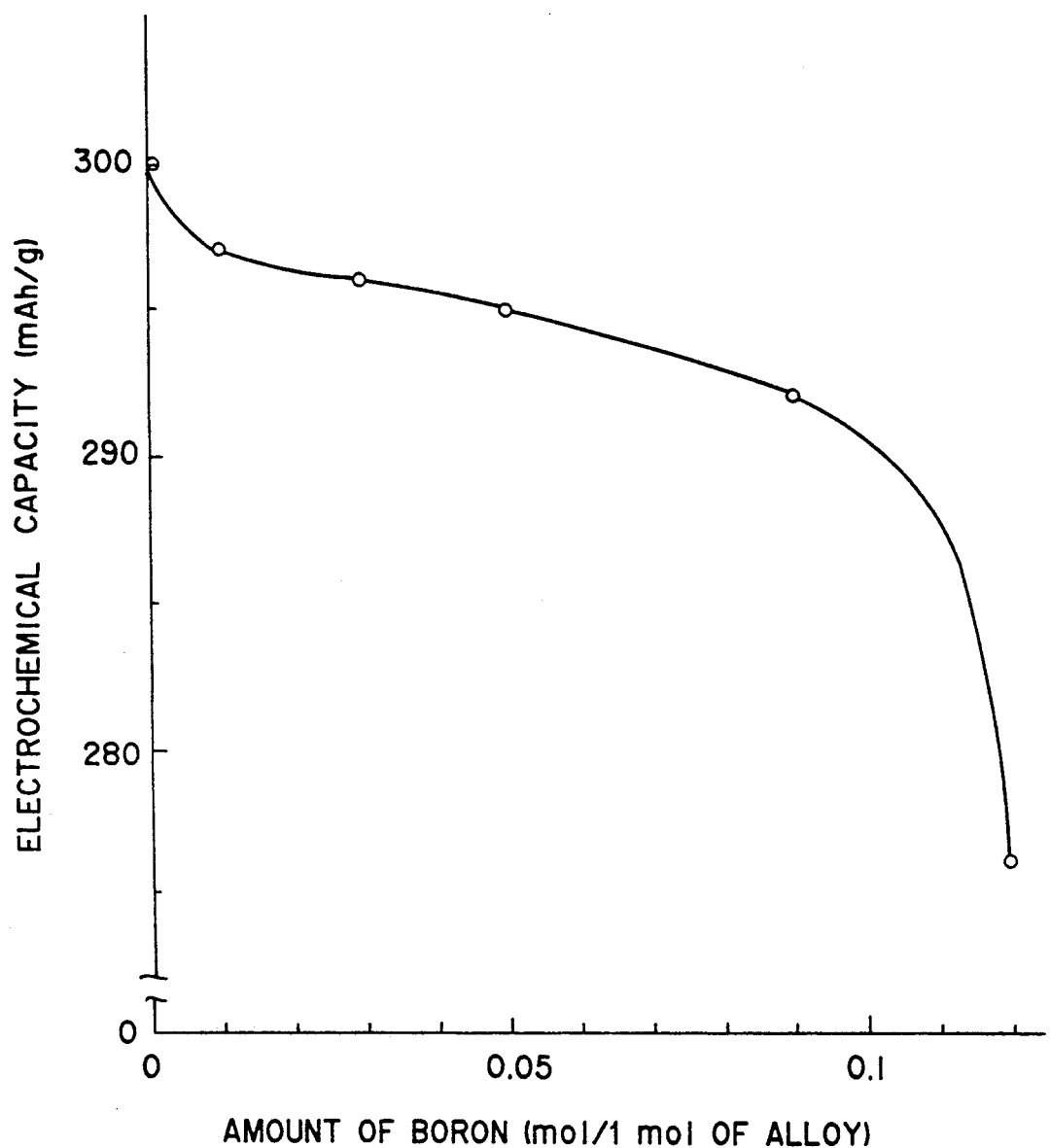
FIG. 8 is a graph showing the relationship between the amount of boron and the electrochemical capacity.

The relationship between the amount of B and the electrochemical capacity was obtained using $MmNi_{3.2}CoMn_{0.6}Al_{0.2}Bx$ ($x \geq 0$). The results shown in FIG. 8 indicate that it is desirable that B is added in 0.005 to 0.1 mol per 1 mol of the alloy.

It has been confirmed through experiments that adding B in approx. 0.015 mol or more per 1 mol of the alloy results in the formation of two metal phases: a main metal phase for absorbing and desorbing hydrogen and a subordinate metal phase including B. When the two metal phases are formed, cracks are promoted to occur as has been proved by Experiment 7, whereby a surface area is increased and thus the reaction speed gets higher. It has also been confirmed through experiments that adding B in less than approx. 0.015 mol per 1 mol of the alloy results in that B is dissolved in the main metal phase with no formation of the subordinate metal phase being confirmed, but that cracks are still promoted to occur.

Other Points to Note (a) Although Ni of the rare earth - Ni alloy can be partially substituted by another element, at least 1.0 mol of Ni is indispensable for promoting electrode reaction.

(b) In a hydrogen-absorbing alloy expressed by the composition formula RBxMy (R: rare earth elements and alkali earth elements; and M: Ni, Co, etc.), y (the stoichiometric ratio of M against R) is usually 5. However, optimization is required depending on the amount of B. For example, the above stoichiometric ratio is desirably 5 or less, when adding B in approx. 0.05 mol. Though hydrogen absorption pressure is raised slightly when B is added, the absorption pressure can be kept low by adjusting the above stoichiometric ratio to 5 or less.

The following has been proved by experiments. When $y<3.5$, the amount of absorbed hydrogen is not reduced much, but hydrogen is hard to diffuse electrochemically. Accordingly, the discharge capacity is decreased. When $y>6.0$, the equilibrium pressure is raised. Therefore, the amount of absorbed hydrogen is reduced much in the room temperature. In conclusion, $3.5<y<6.0$ is desirable.

EMBODIMENT 2

Examples 1 Through 7 According to the Present Invention

Electrodes $B_1$ through $B_7$ were produced in the same manner as in Example 1 of Embodiment 1 but using alloys as shown in Table 7. 1.0 g of alloy was included in each electrode.

Electrodes $B_1$ through $B_7$ were each combined with a positive electrode having a capacity of 1,000 mA to produce a cylindrical nickel-hydrogen storage cell. As an electrolyte, a 30 wt. % solution of KOH was used. The obtained cells will be referred to as Cell $b_1$ through $b_7$, respectively.

COMPARATIVE EXAMPLE

Electrode Y was produced in the same manner as in Example 1 of Embodiment 2 but with no B added.

Electrode Y was combined with a positive electrode having a capacity of 1,000 mA to produce a cylindrical nickel-hydrogen storage cell. As an electrolyte, a 30 wt. % solution of KOH was used. The obtained cell will be referred to as Cell y.

TABLE 7

| Cell | Alloy composition | Discharge capacity after 1st cycle (mAh/g) |
|---|---|---|
| $b_1$ | $MmNi_{3.2}CoMn_{0.6}Al_{0.2}B_{0.1}$ | 186 |
| $b_2$ | $MmNi_{3.2}CoMn_{0.6}Al_{0.2}B_{0.06}Ti_{0.03}$ | 192 |
| $b_3$ | $MmNi_{3.2}CoMn_{0.6}Al_{0.2}B_{0.06}Zr_{0.03}$ | 190 |
| $b_4$ | $MmNi_{3.2}CoMn_{0.6}Al_{0.2}B_{0.06}V_{0.03}$ | 180 |
| $b_5$ | $MmNi_{3.2}CoMn_{0.6}Al_{0.2}B_{0.06}Nb_{0.03}$ | 193 |
| $b_6$ | $MmNi_{3.2}CoMn_{0.6}Al_{0.2}B_{0.06}Mo_{0.03}$ | 179 |
| $b_7$ | $MmNi_{3.2}CoMn_{0.6}Al_{0.2}B_{0.09}$ | — |
| y | $MmNi_{3.2}CoMn_{0.6}Al_{0.2}$ | 111 |

Experiment 1

Concerning Cells $b_1$ through $b_6$ and y, the initial charge/discharge efficiency was examined. The cells were each charged by a current of 50 mA/g for 4 hours and then discharged by a current of 150 mA/g until the voltage reached 1.0 V.

Cells $b_1$ through $b_6$ employing the electrodes according to this invention each have a discharge capacity which is as 1.6 times or more as large as Cell y employing the electrode as the comparative example. Cells $b_1$ through $b_6$ have the excellent charge/discharge efficiency from the moment the cells are completed.

Experiment 2

Figure 9:
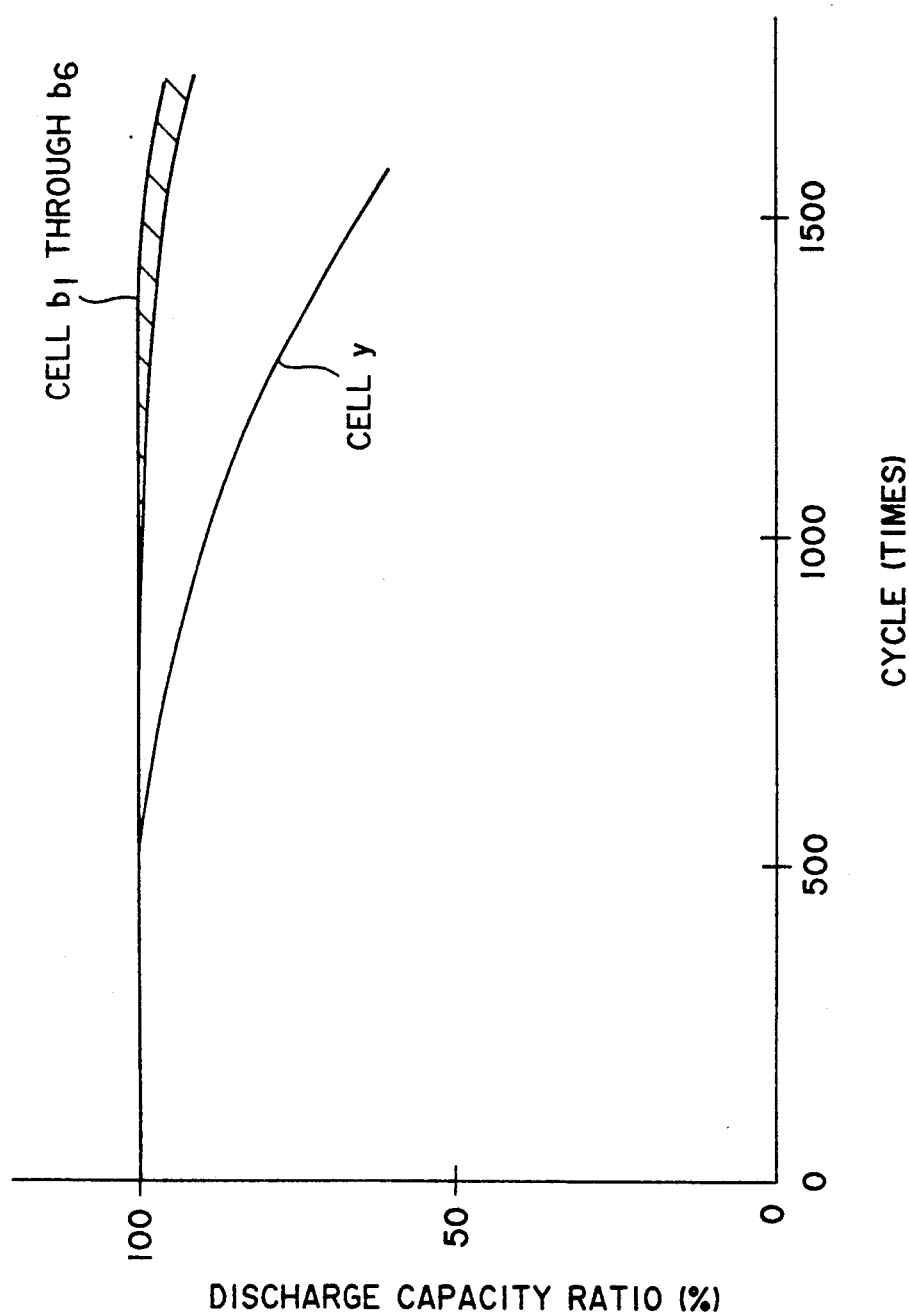
FIG. 9 is a graph showing the charge/discharge cycle characteristics of cells $b_1$ through $b_6$ which employ electrodes according to the present invention and cell y which employs an electrode as a comparative example.

Cells $b_1$ through $b_6$ and y were each subjected to a charge/discharge cycle test, the results of which are shown in FIG. 9. The cells were each charged by a current of 200 mA/g for 1.5 hours and then discharged by a current of 200 mA/g until the voltage reached 1.0 V.

Cells $b_1$ through $b_6$ indicate a much smaller decline in the discharge capacity than Cell y.

Experiment 3

Figure 10:
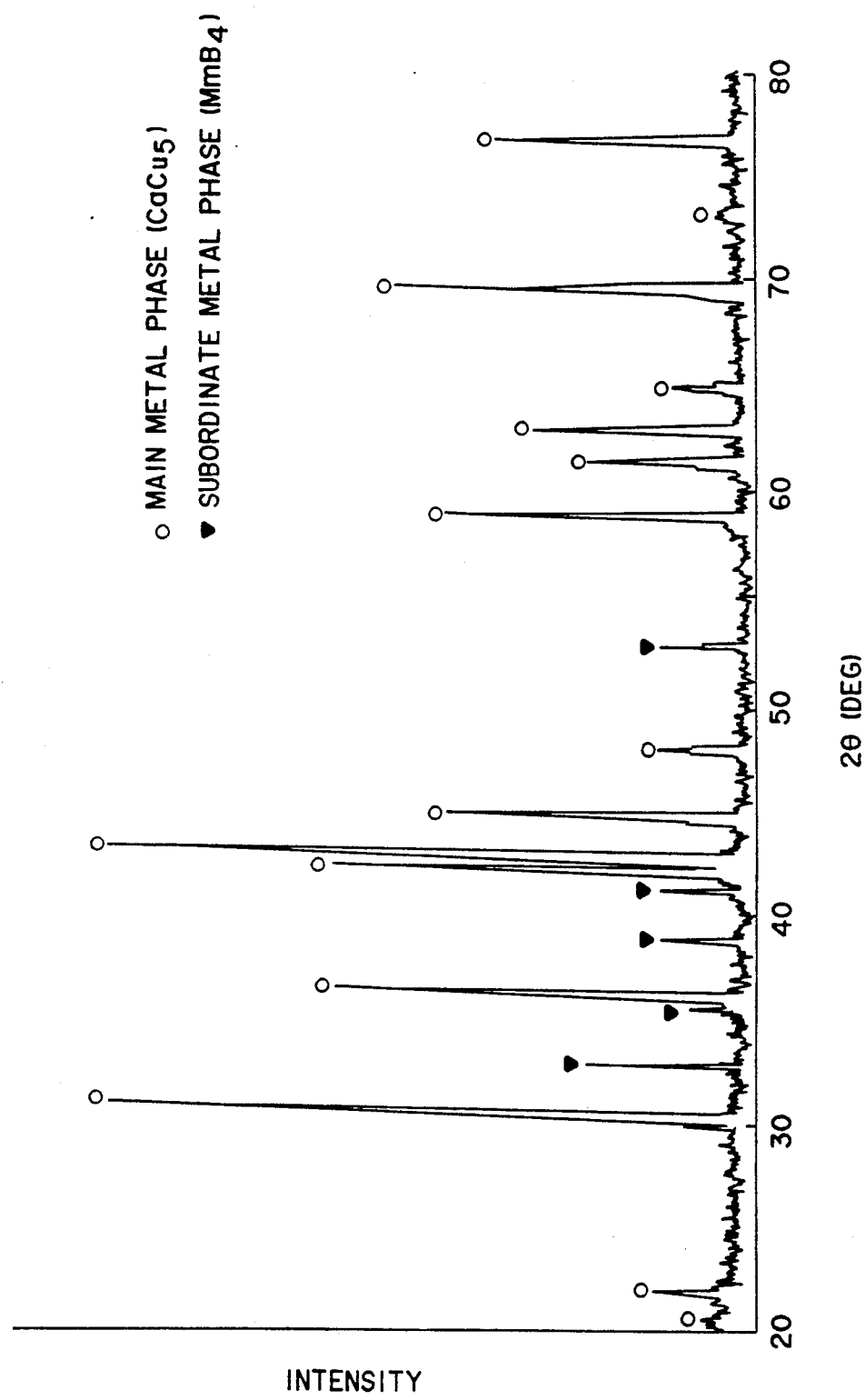
FIG. 10 is an X-ray diffraction diagram of the alloy of Electrode $B_7$ according to the present invention.
Figure 11:
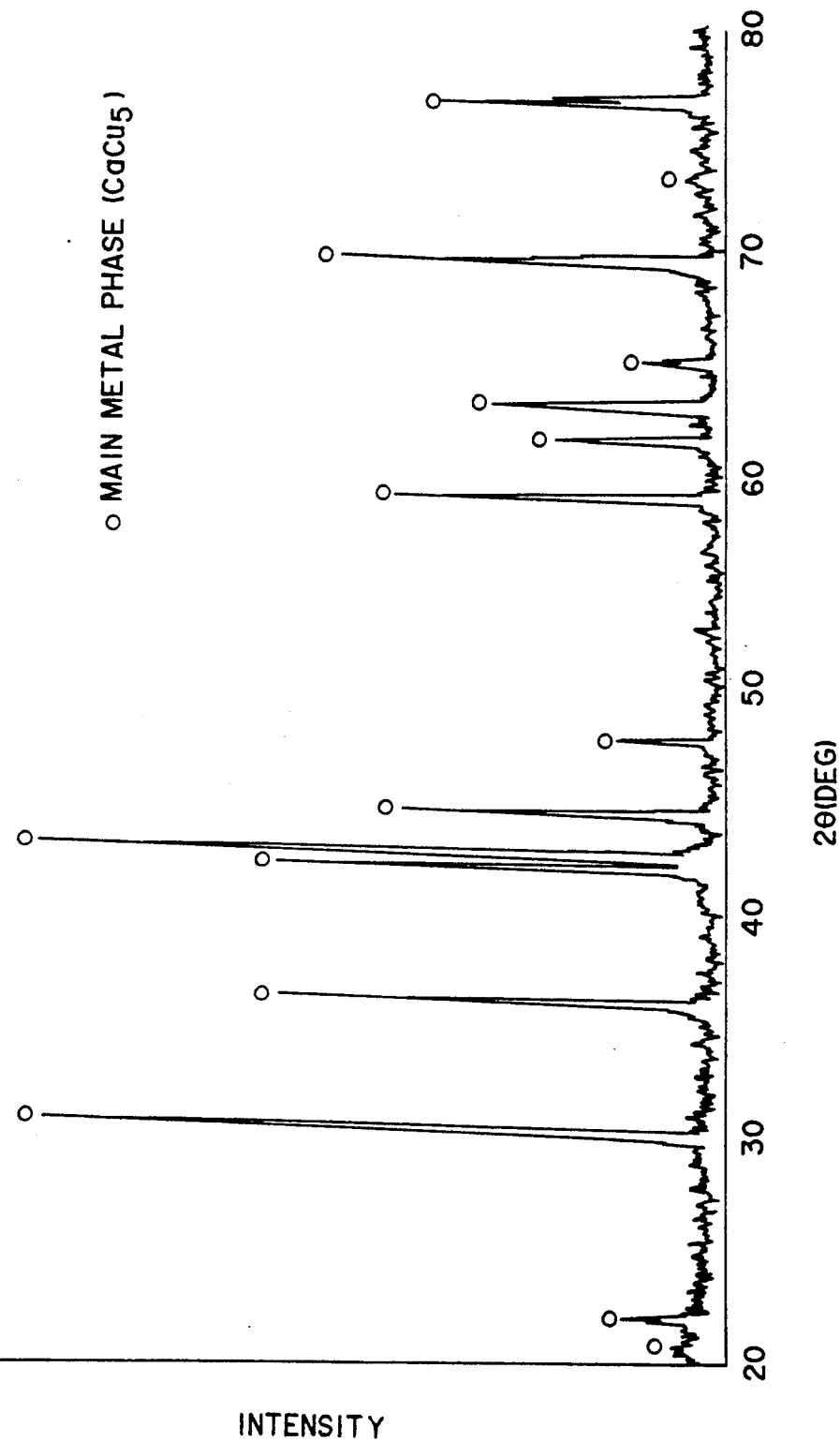
FIG. 11 is an X-ray diffraction diagram of the alloy of Electrode Y as a comparative example.

The alloys of Electrodes $B_7$ and Y were analyzed in the state of powders by X-ray diffraction, the results of which are shown in FIGS. 10 and 11, respectively. The experimenting conditions were as follows:

X-ray: CuKα
Scanning scope: $20° \leq 2\theta \leq 80°$
Scanning speed: 2°/ min.

As apparent from FIGS. 10 and 11, the alloy of Electrode Y (FIG. 11) has a single composition of a main metal phase ($CaCu_5$) while the alloy of Electrode $B_7$ (FIG. 10) indicates peaks of both $CaCu_5$ and $MmB_4$, $MmB_4$ being classified as a boron compound (subordinate metal phase). Although not shown, the same results were obtained with the alloys of Electrodes $B_1$ through $B_6$.

As has been described so far, the alloys according to the present invention each have a main metal phase of a comparatively soft rare earth element- or an alkali earth element - nickel, in which a subordinate metal phase including boron is diffused. Owing to such a construction, the above alloys are too hard to become fine powders easily. As a result, the cells including the alloys according to this invention are excellent in the charge/discharge cycle characteristics.

Moreover, since the alloys according to the present invention are hard but easy to crack, comparatively big cracks are formed on the initial stage of charge/discharge cycles. An electrolyte easily goes into new surfaces formed due to cracks, which increases the initial discharge capacity of the electrode including the above alloys. In consequence, the cell comprising the electrode according to this invention are excellent in the charge/discharge efficiency.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a hydrogen-absorbing alloy electrode for an alkaline storage cell comprising a hydrogen-absorbing negative electrode, a positive electrode and an electrolyte, the improvement comprising:
a hydrogen-absorbing alloy consisting essentially of RBxMy present as a main metal phase and a subordinate metal phase, the main metal phase being represented by a composition formula R-My and the subordinate metal phase of the alloy includes at least boron, R being at least one element selected from a group consisting of rare earth elements and alkali earth elements, and M being at least one element selected from a group consisting of Ni, Co, Mn, Al, Cr, Fe, Cu, Sn, Sb, Mo, V, Nb, Ta, Zn, Zr and Ti, x being greater than 0.015 and less than 0.1 and y being greater than 3.5 and less than 6.0, said alloy having a hydrogen absorption pressure of 0.05 to 5 air pressure at a temperature of 40° C.

2. A hydrogen-absorbing alloy of claim 1, wherein the subordinate metal phase includes at least a metal phase selected from a group consisting of a compound phase of boron and a metal selected from the group consisting of Ti, Zr and Hf, a compound phase of boron and a metal selected from the group consisting of V, Nb and Ta, and a compound phase of boron and a metal selected from the group consisting of Cr, Mo and W.

3. A hydrogen-absorbing alloy of claim 1, wherein M is at lest one element selected from the group consisting of Co and Al.

4. A hydrogen-absorbing alloy of claim 1, wherein M is at least one element selected from the group consisting of Co and Mn.

5. A hydrogen-absorbing alloy of claim 1, wherein M includes Co, an element selected from the group consisting of Mn and Al, and an element selected from the group consisting of Mo, Zr and Cr.

6. A hydrogen-absorbing alloy of claim 1, wherein M is at least one element selected from the group consisting of Ni and Co.

7. A hydrogen-absorbing alloy of claim 1, wherein M is Ni and Co.

* * * * *

UNITED STATES PATENT AND TRADEMARK OFFICE
CERTIFICATE OF CORRECTION

PATENT NO. : 5,290,509
DATED : March 1, 1994
INVENTOR(S) : Furukawa, et al

It is certified that error appears in the above-indentified patent and that said Letters Patent is hereby corrected as shown below:

Column 5, line 6, change "Mn-Ni alloy" to --Mm-Ni alloy--;

Table 3, $A_8$, change "$MmB_{0.05}Ni_{3.5}Co_{0.07}Mn_{0.8}$" to --$MmB_{0.05}Ni_{3.5}Co_{0.7}Mn_{0.8}$--.

Table 3, $X_5$, change "$MmNi_{3.5}Co_{0.07}Mn_{0.8}$" to --$MmNi_{3.5}Co_{0.7}Mn_{0.8}$--.

Column 7, Table 6, $X_7$, change "$Mm_{0.8}Ca_{0.2}Ni_{3.3}Co_{0.8}Al_{0.3}Mn_{0.04}$" to --$Mm_{0.8}Ca_{0.2}Ni_{3.3}Co_{0.8}Al_{0.3}Mn_{0.4}$--.

Signed and Sealed this

Sixth Day of September, 1994

Attest:

BRUCE LEHMAN

*Attesting Officer*  *Commissioner of Patents and Trademarks*